(12) United States Patent
Al-Hajri

(10) Patent No.: US 10,215,002 B2
(45) Date of Patent: Feb. 26, 2019

(54) DETERMINING WELLBORE LEAK CROSSFLOW RATE BETWEEN FORMATIONS IN AN INJECTION WELL

(71) Applicant: Saudi Arabian Oil Company, Dhahran (SA)

(72) Inventor: Nasser M. Al-Hajri, Eastern Province (SA)

(73) Assignee: Saudi Arabian Oil Company, Dhahran (SA)

( * ) Notice: Subject to any disclaimer, the term of this patent is extended or adjusted under 35 U.S.C. 154(b) by 407 days.

(21) Appl. No.: 15/147,490

(22) Filed: May 5, 2016

(65) Prior Publication Data

US 2017/0321522 A1    Nov. 9, 2017

(51) Int. Cl.

| | | |
|---|---|---|
| *E21B 43/00* | (2006.01) | |
| *E21B 47/10* | (2012.01) | |
| *G06F 17/11* | (2006.01) | |
| *E21B 49/08* | (2006.01) | |
| *E21B 43/12* | (2006.01) | |
| *E21B 47/06* | (2012.01) | |

(52) U.S. Cl.
CPC .............. *E21B 43/00* (2013.01); *E21B 47/10* (2013.01); *E21B 47/1025* (2013.01); *G06F 17/11* (2013.01); *E21B 43/12* (2013.01); *E21B 47/06* (2013.01); *E21B 49/087* (2013.01)

(58) Field of Classification Search
None
See application file for complete search history.

(56) References Cited

U.S. PATENT DOCUMENTS

| | | | |
|---|---|---|---|
| 7,089,167 B2 * | 8/2006 | Poe | E21B 43/14 702/12 |
| 7,369,979 B1 * | 5/2008 | Spivey | E21B 43/14 702/12 |
| 7,580,797 B2 | 8/2009 | Akram et al. | |
| 8,781,747 B2 * | 7/2014 | Ziauddin | E21B 47/10 166/250.01 |

(Continued)

FOREIGN PATENT DOCUMENTS

WO    2013/006232    1/2013

OTHER PUBLICATIONS

Al-Hajri et al., "Calculating Casing Leak Cross Flow Rate Using Surface Injection Data," (SPE 188107) Society of Petroleum Engineers, Jun. 1, 2017; 15 pages.

(Continued)

*Primary Examiner* — Kibrom K Gebresilassie
(74) *Attorney, Agent, or Firm* — Fish & Richardson P.C.

(57) ABSTRACT

Some examples of determining wellbore leak crossflow rate between formations in an injection well are described. During normal operation of an injection well, multiple bottomhole pressures are determined based on multiple surface injection pressures. An Inflow Performance Relationship (IPR) for the injection well is determined based on the multiple bottomhole pressures and the multiple injection flow rates. After shut-in responsive to a subsurface leak, the shut-in injection well is modeled as a producing well having the IPR determined during normal operation of the injection well. A crossflow rate in the injection well at a location of the subsurface leak in the injection well is determined based on the IPR of the modeled producing well.

12 Claims, 6 Drawing Sheets

(56) References Cited

U.S. PATENT DOCUMENTS

| | | | |
|---|---|---|---|
| 9,784,885 B2* | 10/2017 | Al-Ajmi | G01V 99/005 |
| 10,125,586 B2* | 11/2018 | Balan | E21B 43/162 |
| 2008/0210470 A1* | 9/2008 | Stewart | E21B 47/06 |
| | | | 175/48 |
| 2008/0257544 A1 | 10/2008 | Thigpen et al. | |
| 2010/0147066 A1* | 6/2010 | Ziauddin | E21B 47/10 |
| | | | 73/152.29 |
| 2010/0307743 A1* | 12/2010 | Ziuddin | E21B 47/10 |
| | | | 166/250.03 |
| 2011/0308812 A1* | 12/2011 | Bullen | E21B 43/121 |
| | | | 166/372 |
| 2011/0320047 A1* | 12/2011 | Stone | E21B 43/00 |
| | | | 700/282 |
| 2012/0095733 A1* | 4/2012 | Rossi | E21B 43/00 |
| | | | 703/2 |
| 2013/0035920 A1* | 2/2013 | Al-Shammari | E21B 43/12 |
| | | | 703/10 |
| 2013/0116998 A1* | 5/2013 | Shirzadi | E21B 43/20 |
| | | | 703/10 |
| 2015/0039234 A1* | 2/2015 | Abou-Sayed | G01V 99/00 |
| | | | 702/11 |
| 2015/0378052 A1* | 12/2015 | Al-Ajmi | G01V 99/005 |
| | | | 703/2 |
| 2016/0282881 A1* | 9/2016 | Filippov | E21B 43/16 |
| 2016/0319655 A1* | 11/2016 | Awadh | E21B 44/005 |

OTHER PUBLICATIONS

Al-Hajri et al., "Forecasting the Reliability of a Wastewater Disposal System and Predicting Future Corrective Actions Using Hydraulic Simulation," Society of Petroleum Engineers (SPE 177488), Abu Dhabi International Petroleum Exhibition and Conference, Jan. 1, 2015; 11 pages.

International Search Report and Written Opinion of the International Searching Authority issued in International Application No. PCT/US2017/028284 dated Aug. 8, 2017; 11 pages.

Frooqnia, "Numerical Simulation and Interpretation of Borehole Fluid-Production Measurements," Ph.D. dissertation, Copyright 2014, 408 pages.

Economides et al., "Petroleum Production Systems," Second Edition, Copyright 2013, 60 pages.

Craft et al., "Applied Petroleum Reservoir Engineering," Second Edition, Copyright 1991, 226 pages.

* cited by examiner

US 10,215,002 B2

DETERMINING WELLBORE LEAK CROSSFLOW RATE BETWEEN FORMATIONS IN AN INJECTION WELL

TECHNICAL FIELD

This specification relates to crossflow analysis in an injection well.

BACKGROUND

An injection well is used to flow fluid into a subterranean zone that includes a formation, a portion of a formation, or multiple formations, for example, sandstone, limestone or other formations. The injection fluid can be water, wastewater, brine, water mixed with chemicals, combinations of them or other fluids. Injection wells are sometimes used in hydrocarbon recovery. For example, fluid such as steam, carbon dioxide, water, or other fluid can be injected into a hydrocarbon reservoir to maintain reservoir pressure, or heat the hydrocarbon in the reservoir, thereby allowing the hydrocarbon to be recovered from the reservoir. Sometimes, a leak develops inside the injection well causing fluids to flow from a high pressure formation in the subterranean zone to a low pressure formation in another subterranean zone through the injection well, specifically, through the leak. Such leaks can affect an integrity of the injection wells, and, in turn, the hydrocarbon recovery from the hydrocarbon reservoir.

SUMMARY

This specification describes technologies relating to determining wellbore leak crossflow rate between formations in an injection well.

Certain aspects of the subject matter described here can be implemented as a method. During normal operation of an injection well formed in a subterranean zone, multiple bottomhole pressures at a bottom of the injection well are determined based on a respective multiple surface injection pressures at a surface of the injection well. Each surface injection pressure is a pressure in the injection well resulting from a respective injection flow rate at which injection fluid is flowed through the injection well from the surface toward the bottom. An Inflow Performance Relationship (IPR) for the injection well is determined based on the multiple bottomhole pressures and a multiple injection flow rates. Each injection flow rate is caused by each surface injection pressure of the multiple surface injection pressures. After an injection well shut-in responsive to a subsurface leak in the injection well, wherein the leak causes a crossflow from a high pressure region in the subterranean zone to a comparatively low pressure region in another subterranean zone through the injection well, the shut-in injection well is modeled as a producing well having the IPR determined during normal operation of the injection well. A crossflow rate in the injection well at a location of the subsurface leak in the injection well is determined based on the IPR of the modeled producing well.

This, and other aspects, can include one or more of the following features. To model the shut-in injection well as the producing well having the IPR determined during normal operation of the injection well, the location of the subsurface leak in the injection well can be assigned as a top node of the producing well. The IPR for the injection well is determined by modeling the injection well during normal operation and by assigning the surface of the injection well as a top node of the modeled injection well. To determine the crossflow rate in the injection well at the location of the subsurface leak in the injection well, a production flow rate for the producing well at each bottomhole pressure can be determined. The production flow rate at each bottomhole pressure can be assigned as the crossflow rate in the injection well at each bottomhole pressure. The production flow rate is determined using the following equation: $Q = PI(Pr - Pwf)$, where Q is the production flow rate, PI is a productivity index of the producing well, Pr is a static bottomhole reservoir pressure and Pwf is a flowing bottomhole reservoir pressure of the producing well at a selected node, being the subsurface leak depth, after the injection well shut-in responsive to a leak. The static bottomhole reservoir pressure of the injection well can be identified before the injection well shut-in. Using the IPR, an injectivity index for the injection well during normal operation of the injection well can be determined. The injectivity index is a ratio between an injection flow rate of the injection fluid into the injection well and a difference between a downhole injection pressure resulting from the injection flow rate and a static bottomhole reservoir pressure. The injectivity index for the injection well can be assigned as the productivity index for the producing well. The determined injectivity index for the injection well during normal operation can be calibrated with a measured injectivity index. The location of the subsurface leak in the injection well can be determined. The location of the subsurface leak in the injection well can be determined by mechanical drifting device conveyed via a wireline intervention into the injection well after the injection well has developed the leak. To determine the IPR for the injection well based on the multiple bottomhole pressures and the multiple injection flow rates, a PQ curve for the IPR can be determined. $P_{downhole\ inj.}$ represents a bottomhole pressure and Q represents an injection flow rate of the injection fluid into the injection well at the surface of the injection well. P in the PQ curve can be determined using the following equation:

$$P\text{downhole inj.} = P_{WH_{inj}} + \frac{\rho_w \sin\emptyset \times D}{144} - \left[\frac{f\rho_w Q^2}{14.79\ g_c d^5}\right],$$

where $P_{WH_{inj}}$ is the surface injection pressure measured for the injection flow rate, $\rho_w$ is the density of the injection fluid, ø is a deviation angle of the injection well relative to a vertical axis, f is a dimensionless friction factor, $g_c$ is acceleration due to gravity, and d is an inside diameter of the injection well. Q in the PQ curve can be determined using the following equation: $Q = II(P_{downhole\ inj.} - Pr)$, where II is an injectivity index of the injection well and Pr is a static bottomhole reservoir pressure of the injection well before the injection well shut-in. The injection fluid can be water.

Certain aspects of the subject matter described here can be implemented as a computer-readable medium storing instructions executable by one or more processors to perform operations. During normal operation of an injection well formed in a subterranean zone, multiple injection flow rates at which an injection fluid is flowed into an injection well formed in a subterranean zone are received. Multiple surface injection pressures measured at a surface of the injection well for the respective multiple injection flow rates are received. Multiple bottomhole pressures at a bottom of the injection well are determined based on the respective multiple surface injection pressures and the respective multiple injection flow rates. A flow of the injection fluid through the injection well from the surface to a bottom of the injection well is modeled. After an injection well shut-in responsive to a subsurface leak in the injection well, wherein the leak causes a crossflow from a high pressure region in the subterranean zone to a comparatively low pressure region in the subterranean zone through the injection well, the shut-in injection well is modeled as a producing well having a same model as the modeled injection well during normal operation. The subsurface location of the leak is assigned as a top node of the modeled producing well. A crossflow rate in the injection well is determined at the location of the subsurface leak in the injection well based on the modeled producing well.

This, and other aspects, can include one or more of the following features. To model the flow of the injection fluid through the injection well from the surface to the bottom of the injection well, an Inflow Performance Relationship (IPR) for the injection well can be determined based on the multiple bottomhole pressures and the multiple injection flow rates. A PQ curve for the injection well can be determined using the IPR wherein P represents a bottomhole injection pressure and Q represents an injection flow rate of the injection fluid into the injection well at the surface of the injection well. To model the shut-in injection well as the producing well having the same model as the modeled injection well during normal operations, an injectivity index for the injection well can be assigned as a productivity index for the producing well and a PQ curve for the producing well can be generated based on the productivity index. To determine the crossflow rate in the injection well at the location of the subsurface leak in the injection well based on the modeled producing well, the crossflow rate can be determined using $Q=PI(Pr-Pwf)$, where Q is the production flow rate, PI is a productivity index of the producing well, Pr is a static bottomhole reservoir pressure and Pwf is a flowing bottomhole reservoir pressure of the producing well at a selected node, being the subsurface leak depth, after the injection well shut-in responsive to a leak. Knowing the PI (the productivity index of the producing well which is assigned as the injectivity index of the normal well) and Pr (which is the static bottomhole reservoir pressure of the injection well before the injection well shut-in) different bottomhole flowing pressures (Pwf) can be assumed and their corresponding flow rates (Q) can be generated. A bottomhole flowing pressure that is equal to the pressure across the leak depth will generate the cross flow rate of the producing well (i.e. the leak cross flow rate). The injection fluid can be water.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1A:
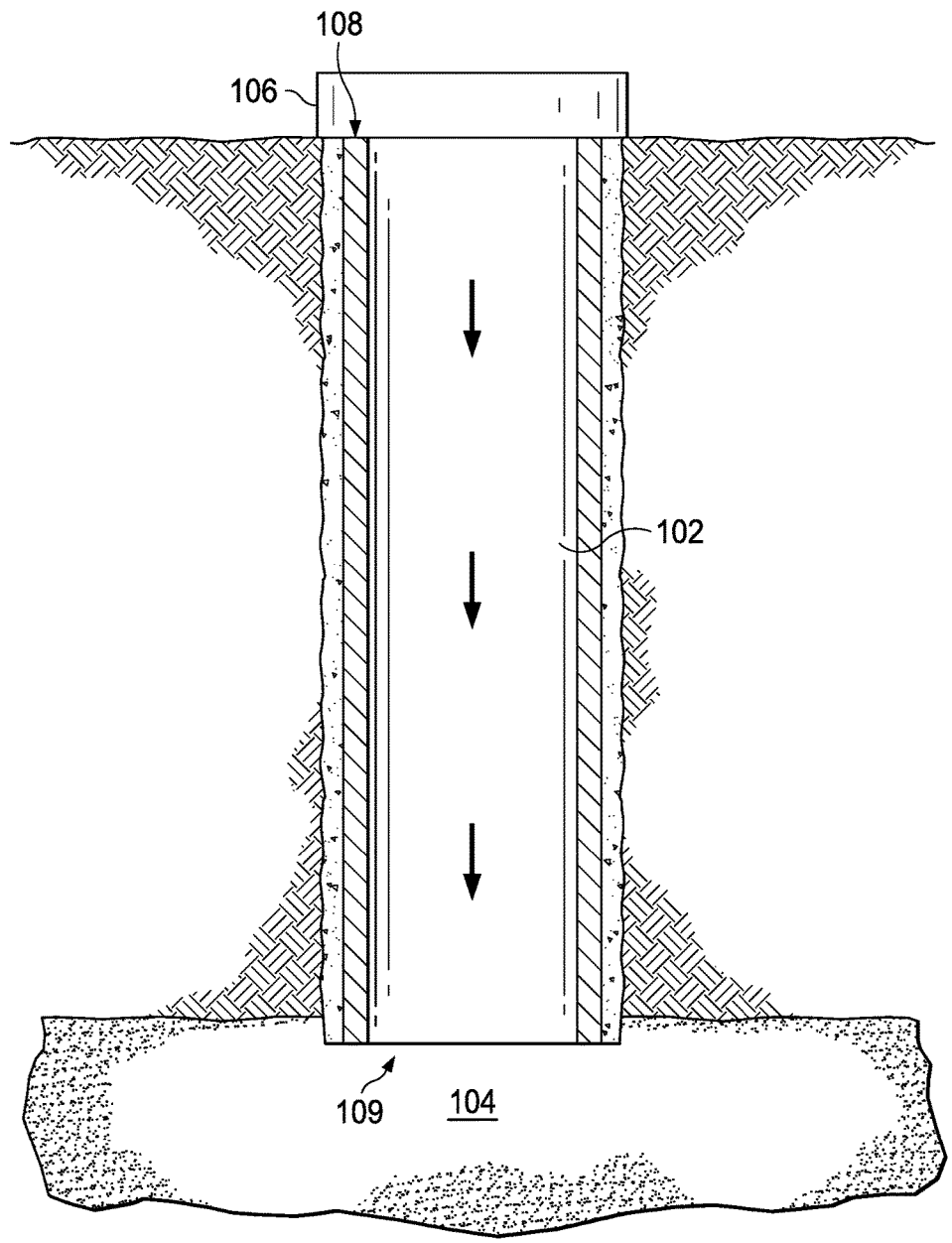
FIG. 1A is a schematic diagram of an injection well.

This specification describes determining the crossflow rate between two formations resulting from a downhole leak in a water well. Well integrity monitoring is an important aspect of safe well production or injection operations of both. Certain well integrity monitoring systems include wellhead tree valve tests, lending base inspections, annuli surveys, and temperature and corrosion logging. When an integrity issue arises, well prepared operations are performed using a workover rig to restore well integrity. Wells under leak crossflow more are classified as being in a well control situation. One step of proper well integrity diagnostics includes quantifying leak crossflow rates to plan for crossflow isolation and subsequent well workover to secure such wells. One technique to quantify crossflow rate includes running spinners (for example, flow meters) by wireline, coiled tubing or other conveyance methods to a subsurface location of the leak, and identifying both the crossflow rate and a direction of the crossflow using the spinners. However, such measurements may not be operationally or economically viable at times. This specification describes determining the crossflow rate without implementing such spinners, but instead using surface data measured during normal operation of the well. By implementing the techniques described in this specification, well securement design can be optimized while minimizing well interventions, cost associated with running a spinner downhole can be minimized or avoided and potential mechanical damage resulting from well intervention via a spinner can also be minimized or avoided.

As described later, the crossflow rate between two formations in a leaking injection well is determined using well injection and well shut-in data prior to and post the leak without the need for a spinner or flow meter. To do so, well performance modeling and nodal analysis are implemented on the injection well. Well performance modeling is a consistently dependable tool in establishing well injection or production behavior. Well performance modeling is particularly effective in water wells due to the single phase flow characteristic of water injectors that facilitate accurate computation of dynamic well parameters. Well performance modeling using nodal analysis is implemented by dividing the well system into different segments based on selected nodes.

In some implementations, surface injection pressures at a surface of an injection well measured in response to injection flow rates of an injection fluid into the well are converted into bottomhole pressures at the bottom of the well. Well physical parameters and static bottomhole reservoir pressure are used to generate an Inflow Performance Relationship (IPR). To generate the IPR, location of the injection well (for example, a wellhead at a surface of the injection well) is selected as a top node of the injection well model. After a shut-in necessitated by a leak in the injection well, an imaginary water production well model is generated. The IPR generated for the injection well during normal operation is assigned to the imaginary water production well, and the subsurface location of the leak in the injection well is selected as a top node of the imaginary water production well. The crossflow rate across the leak at the subsurface location is then determined for the imaginary water production well using the assigned IPR.

Figure 3:
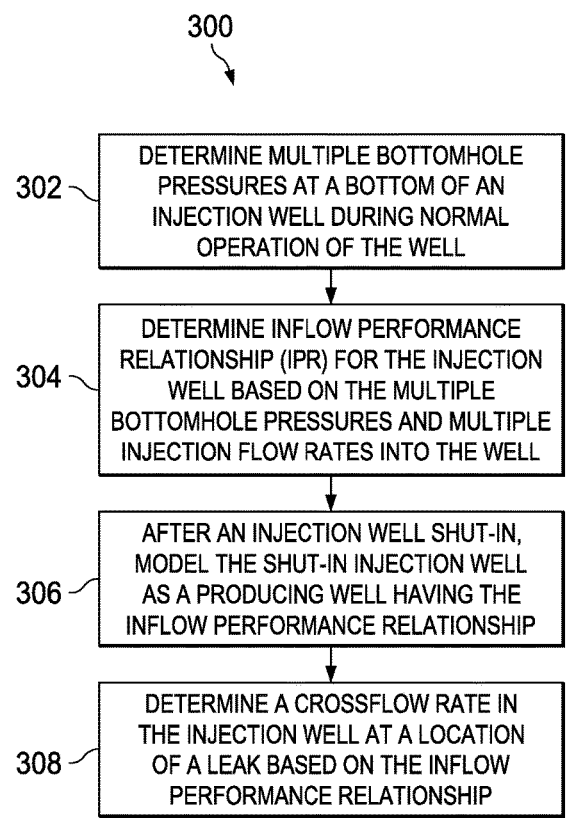
FIG. 3 is a flowchart of an example process of determining a crossflow rate in the injection well at a location of a leak.

FIG. 1A is a schematic diagram of an injection well 102. The injection well 102 is formed from a surface through a subterranean zone to extend into a formation 104. A wellhead 106 is positioned at the surface of the injection well 102. During normal operation, injection fluid (for example, water or other fluid) is flowed from the surface through the injection well 102 to the formation 104. During normal operation, the IPR for the injection well 102 is generated to relate injection flow rates at which the injection fluid is flowed into the injection well 102 with the bottomhole flowing pressure of the injection well 102. The processes for determining the IPR are described with reference to FIG. 3, which is an example process 300 of determining a crossflow rate in the injection well at a location of a leak.

At 302, multiple bottom hole pressures at a bottom of the injection well 102 are determined based on the respective multiple surface injection pressures at the surface of the injection well 102. Each surface injection pressure is a pressure in the injection well resulting from a respective injection flow rate at which the injection fluid is flowed through the injection well 102 from the surface towards the bottom. The injection flow rate is determined as described with reference to FIG. 1B.

Figure 1B:
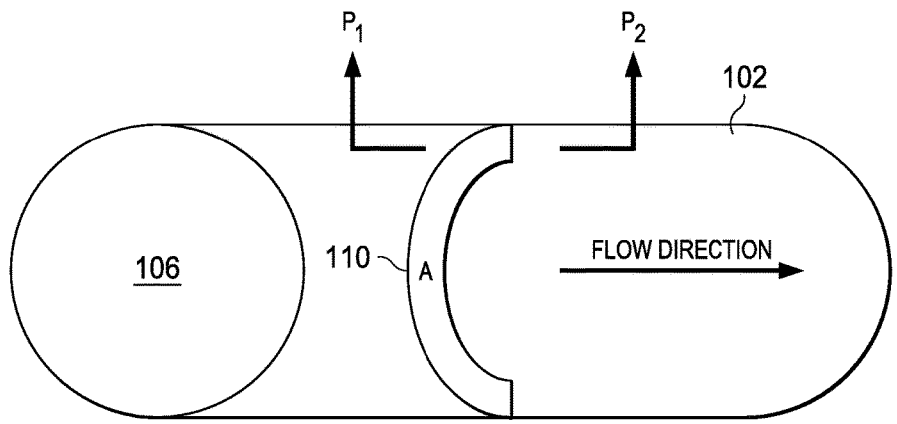
FIG. 1B is a schematic diagram of a side view of the injection well surface flowline of FIG. 1A including an orifice plate.

FIG. 1B is a schematic diagram of a side view of the injection well surface flowline 102 including an orifice plate 110. The orifice plate 110 is used to measure injection data, which includes injection fluid flow rate and injection wellhead pressure at the surface of the injection well 102. For example the volumetric injection fluid flow rate into the injection well at the surface can be a pressure differential upstream and downstream of the orifice plate 110 using Equation 1.

$$Q = \frac{22800 d_2^2}{\sqrt{1 - \left(\frac{d_2^4}{d_1}\right)}} \sqrt{\frac{(P_1 - P_2)}{\rho_w}}$$ (Equation 1)

In Equation 1, Q is the volumetric flow rate (for example, in barrels (bbls) per day), $d_1$ is an inner diameter (for example, in inches) of a pipe in the injection well 102 through which the injection fluid flows, $d_2$ is an orifice diameter (for example, in inches) of an orifice in the orifice plate 110, $P_1$ is an injection fluid pressure (for example, in pounds per square inch (psi)) upstream of the orifice plate 110, $P_2$ is an injection fluid pressure (for example, in psi) downstream of the orifice plate 110, and $\rho_w$ is the density of the injection fluid (for example, in pounds per cubic feet). The injection fluid pressures upstream and downstream of the orifice plate 110 can be measured using one or more pressure sensors installed at one or more appropriate locations, respectively, in the injection well flowline 102.

The injection wellhead pressure is measured using a pressure sensor, for example, a pressure gauge or other pressure sensor, installed at the wellhead 106. A quantity and a flow rate of the injection fluid through the injection well 102 can be varied, for example, by operating the injection fluid pumps at different capacities. For each quantity, a respective injection wellhead pressure can be measured and a respective volumetric injection fluid flow rate can be calculated using Equation 1. The measured injection wellhead pressures and the calculated volumetric injection fluid flow rates can then be used to determine bottomhole pressures at the bottom of the injection well 102 as described later.

The multiple bottom hole pressures at the bottom of the injection well are determined using Equations 2 and 3.

$$P_{Downhole_{inj}} = P_{WH_{inj}} + \Delta P_g - \Delta P_f$$ (Equation 2)

$$P_{Downhole_{inj}} = P_{WH_{inj}} + \frac{\rho_w \sin\phi \times D}{144} - \left[\frac{f \rho_w Q^2}{14.79 g_c d^5}\right]$$ (Equation 3)

In Equation 2, $P_{Downhole_{inj}}$ is the bottom hole injection pressure (for example, in psi), $P_{WH_{inj}}$ is the wellhead injection pressure (for example, in psi), $\Delta P_g$ is the gravitational delta pressure (for example, in psi) and $\Delta P_f$ is the frictional delta pressure (for example, in psi). In Equation 3, the wellhead injection pressure is measured and the gravitational pressure exerted by the injection water is represented by the formula $$\frac{\rho_w \sin\phi \times D}{144},$$

in which $\rho_w$ is the density of the injection fluid (for example, water or other single phase fluid). The angle φ is a wellbore deviation angle measured with reference to the vertical axis and D is a depth of the injection well (for example, in feet). Also, in Equation 3, the frictional delta pressure is measured using the formula $$\frac{f \rho_w Q^2}{14.79 g_c d^5},$$

where f is a dimensionless fiction factor, $g_c$ is acceleration due to gravity (32.2 ft/sec) and d is an inside diameter of the pipe in the injection well 102 through which the injection fluid flows.

In this manner, the IPR of the injection well 102 is determined during normal operation of the injection well 102 to relate the volumetric injection flow rate (Q) and the bottom hole flowing pressure (P) at the bottom of the injection well 102. The IPR describes the subsurface fluid flow of water into the formation 104 and the corresponding injectivity index. By varying the volumetric injection flow rate, different bottom hole flowing pressures can be calculated, and a PQ curve for the IPR generated for the injection well 102 can be plotted using reservoir pressure or wellhead pressure as a node 109 or 108, respectively.

Figure 2:
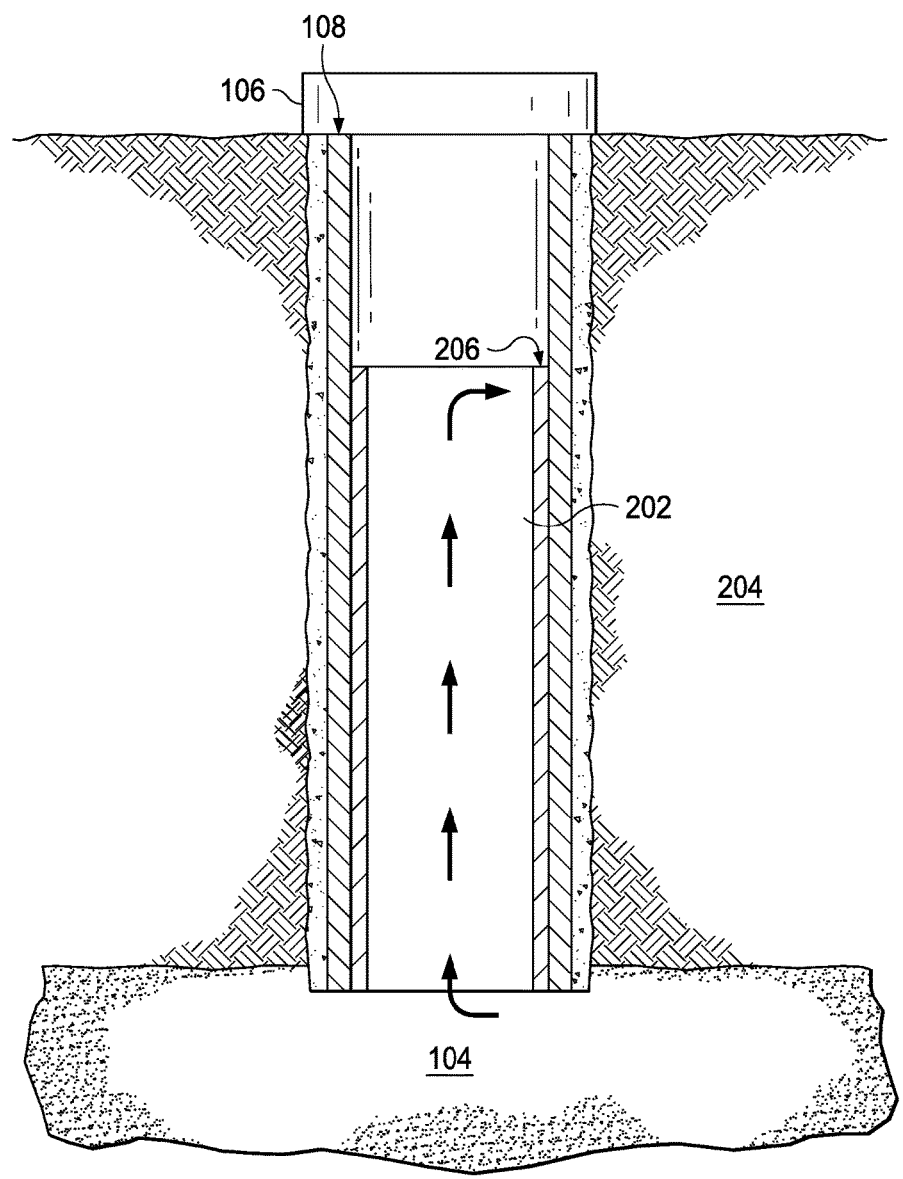
FIG. 2 is a schematic diagram of an imaginary producing well with a leak.

At 304, after an injection well shut-in responsive to a subsurface leak in the injection well 102 the shut-in injection well is modeled as an imaginary producing well having the IPR determined during normal operation of the injection well 302. FIG. 2 is a schematic diagram of an imaginary producing well with a leak in the injection well 102 which causes a crossflow from a high-pressure region (for example, the formation 104) to a comparatively low-pressure region in the subterranean zone (for example, formation 204) through the injection well 102. The subsurface location of the leak is assigned as a top node 206 of the imaginary producing well. In other words, the imaginary producing well is considered as having the same physical dimension of the injection well 102 and to have a production wellhead at the leak depth and that the total depth of the well is from the leak depth to the formation 104. The location of the leak can be identified by lowering a mechanical drifting tool conveyed via a wireline intervention into the shut-in injection well 102. In addition, it is assumed that the fluid being produced by the well is the injection fluid, that is, water or other single phase fluid flowing at a steady state from the high pressure formation 104 to the low pressure formation 204.

To model the shut-in injection well as the imaginary producing well having the IPR determined during normal operation of the injection well 302, an injectivity index is determined for the injection well 102 using Equation 4.

$$Q=II(P_{Downhole_{inj}}-P_r)$$ (Equation 4)

In Equation 4, Q is the volumetric flow rate (for example, in barrels (bbls) per day) determined using Equation 1, $P_{Downhole_{inj}}$ is the bottom hole injection pressure (for example, in psi) determined using Equations 2 and 3, and $P_r$ is the static bottom hole (reservoir) pressure measured before the injection well 102 was shut-in.

The injected with the index is a ratio between an injection flow rate of the injection fluid into the injection well and a difference between a downhole injection pressure resulting from the injection flow rate and a static bottom hole reservoir pressure. Injectivity indices are periodically calculated for the injection well 102 during normal operation from pressure fall off measurements. Over time, a bottom hole pressure resulting from a surface injection pressure can vary for the same well, for example, due to continuous application of pressure through the well. In some implementations, calibration operations (described later) can be implemented to calibrate the IPR.

At 306, a crossflow rate in the injection well 102 at a subsurface location of the leak is determined based on the IPR of the modeled producing well. To do so, the injectivity index determined using Equation 4 is assigned to be a productivity index for the imaginary producing well. A new PQ curve is determined for the imaginary producing well using the productivity index assigned to the imaginary producing well. As described earlier, the top node for the imaginary producing well model is assigned as the subsurface location of the leak. The crossflow rate in the injection well 102 at the subsurface location is then determined using Equation 5.

$$Q=PI(P_r-P_{Downhole_{inj}})$$ (Equation 5)

In Equation 5, Q is the production flow rate (that is, the crossflow rate through the subsurface location of the leak), $P_r$ is the static bottom hole (reservoir) pressure measured before the injection well 102 was shut-in and $P_{Downhole_{inj}}$ is the bottom hole injection pressure (for example, in psi) of the leak formation for a well having the well parameters (that is, depth, internal diameter) of the imaginary producing well. In particular, because a leak depth of the imaginary producing well is different from a depth of the injection well 102, the bottom hole injection pressure determined for the imaginary producing well will be different from that determined for the injection well 102. Consequently, the crossflow rate through the subsurface location of the leak will also be different from the volumetric flowrate at a surface of the injection well 102.

Example

Figure 4:
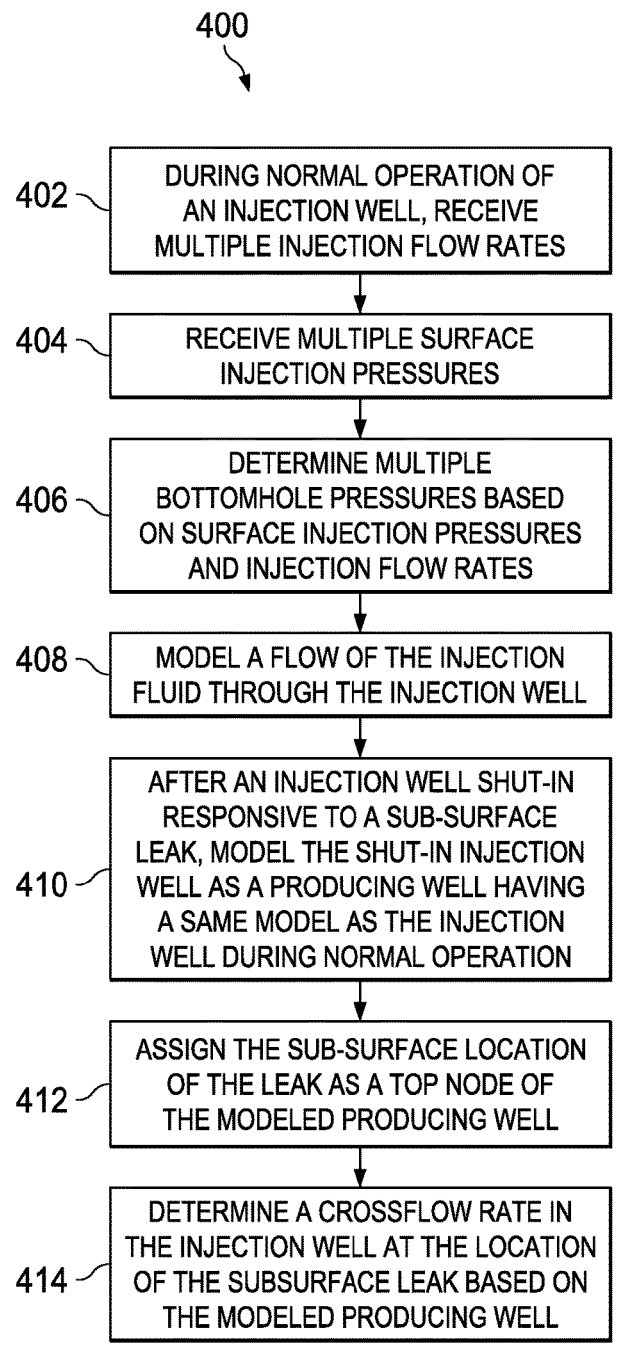
FIG. 4 is a flowchart of an example process of modeling a leak in an injection well.

The techniques described above were implemented in an injection well formed into a downhole formation that was 7280' below the surface. FIG. 4 is a flowchart of an example process 400 of modeling a leak in the injection well. In some implementations, the process 400 can be implemented using a computer system that includes one or more processors and one or more computer-readable storage media storing instructions executable by the one or more processors to perform operations. Initially, the computer system converts surface injection pressures at the surface of the injection well to downhole pressures to generate the injecting formation IPR and to calculate II and reservoir pressure.

At 402, multiple injection flow rates at which the injection fluid is flowed into the injection well are received. For example, the computer system can determine the multiple injection rates using Equation 1 described earlier. A raw solar flowmeter was implemented to measure the volumetric flowrate at the wellhead of the injection well.

At 404, multiple surface injection pressures measured at a surface of the injection well for the respective multiple injection flow rates is received. For example, the computer system receives the surface injection pressures from one or more pressure gauges installed at the wellhead or at or near an orifice plate positioned in the injection well.

Figure 5:
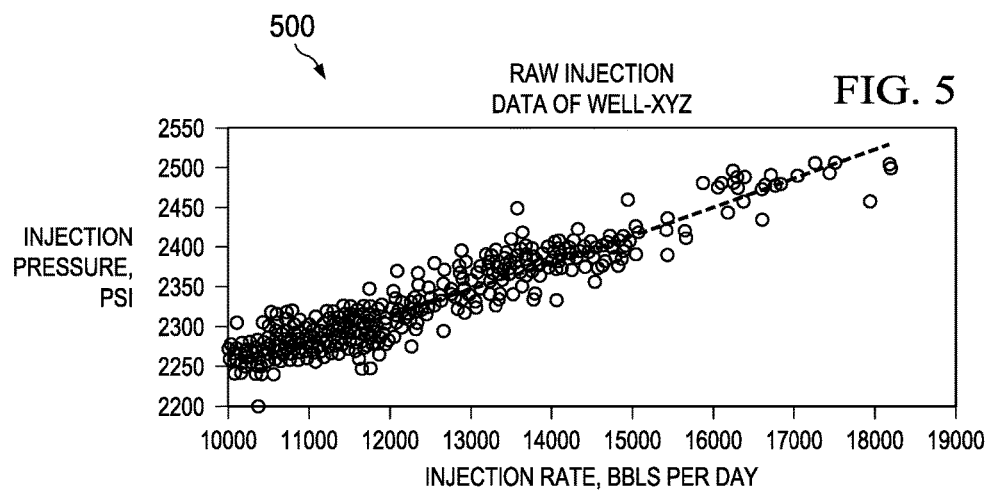
FIG. 5 is a plot showing surface injection pressures versus surface injection flow rates of injection fluid into the injection well.

Using the multiple surface injection pressures and the corresponding volumetric injection flowrates, a plot 500 showing surface injection pressures versus surface injection flow rates of injection fluid into the injection well is generated, as shown in FIG. 5. The X-axis shows the injection rate into the injection well measured in barrels per day. The Y-axis shows the surface injection pressures corresponding to each injection rate. The flowrate measured using the raw solar flowmeter is substantially (or exactly) identical to the volumetric injection flowrate determined using Equation 1. By "substantially," it is meant that a variance between the flowrate measured using the raw solar flowmeter and that determined using Equation 1 for the same surface injection pressure is within 10%.

At 406, multiple bottomhole pressures at a bottom of the injection well are determined based on the respective multiple surface injection pressures and the respective multiple injection flow rates. For example, the computer system can be configured to execute Equations 2 and 3 described earlier to determine the bottomhole pressure for each surface injection pressure and corresponding volumetric injection flow rate.

At 408, a flow of the injection fluid through the injection well from the surface to a bottom of the injection well is modeled. For example, the computer system can assign a surface of the injection well as a top node. The depth, D, in Equation 3 can be determined based on the assigned top node. The computer system can determine the IPR for the injection well by executing Equations 2 and 3. By determining the bottomhole injection pressures for multiple volumetric injection flowrates, the computer can determine a set of PQ curves for the IPR.

The base IPR model, generated as described earlier, was tested using the wellhead as a system node. The injection fluid flowrates corresponding to a certain surface injection pressure generated from the IPR base model were compared to the measured injection data, that is, the data measured using the raw solar flowmeter. However, IPR base model results and solar flowmeter data do not match up sometimes due to the unavailability of an injectivity index value (in barrels per day per psi) that corresponds to the same time of recording the solar flowmeter injection data. Consequently, the IPR base model was calibrated by history-matching the PQ curve with actual injection data. If an injectivity index value that corresponds to the same time of recording the solar flowmeter injection data was available, the calibration would not be necessary.

Figure 6:
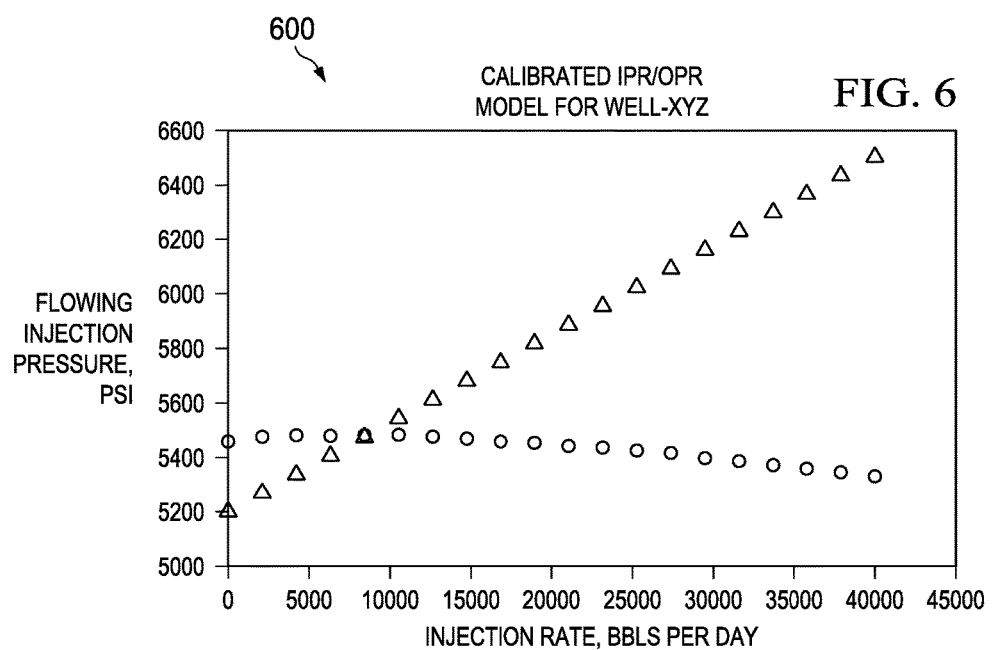
FIG. 6 is a plot showing a calibrated inflow performance relationship for the injection well.

To calibrate, injectivity index history-matching was performed to the base model. Injection fluid flowrates were generated from IPR curves at different injectivity indices using the wellhead as a node, and compared to raw solar flowmeter data until a representative IPR is obtained. FIG. 6 is a plot 600 showing a calibrated inflow performance relationship for the injection well. The line represented by triangles in FIG. 6 represents the flow from the bottom of the well to the reservoir and is governed by Equations 2 and 3. The line represented by circles in FIG. 6 represents the flow from the wellhead to the bottom of the well and is governed by Equation 4.

In response to a leak developing in the injection well, the well was shut-in. At 410, the shut-in injection well was modeled as a producing well having the same model as the modeled injection well during normal operation. That is, the imaginary producing well mimicked the flow characteristics and properties of the injection well with the objective of simulating leak cross flow at shut-in condition in the injection well. The computer system was configured to assign the same reservoir pressure of the injection well to the imaginary producing well. The computer system was also configured to assign the productivity index of the imaginary producing well to be the same as the injectivity index determined for the injection well during normal operation because both wells have the same reservoir rock matrix and fluid properties. In addition, it was assumed that the flow regime through both wells is steady state.

At 412, the subsurface location of the leak was assigned as the top node of the modeled imaginary producing well. For example, the computer system was configured to execute Equations 2 and 3 to determine the PQ curve for the imaginary producing well by using a distance from the subsurface location of the leak to the downhole formation as the depth of the imaginary producing well. To do so, the leak zone depth was identified as part of the injection well integrity diagnostics prior to the workover operation. In this example, the leak zone depth was measured to be at 1,374 ft and water level (vacuum depth or extent) was measured to be at 20 ft.

Figure 7:
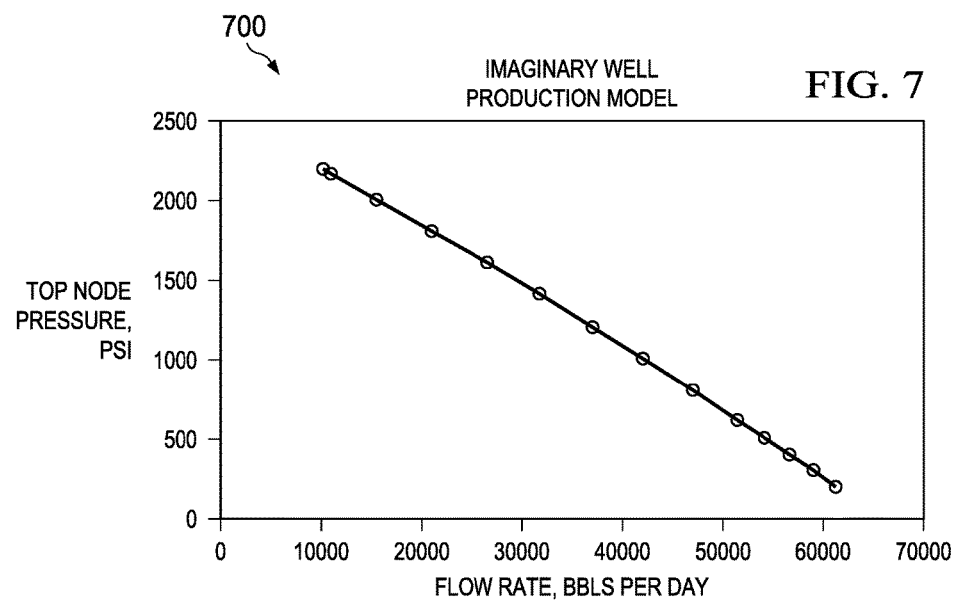
FIG. 7 is a plot showing a PQ curve for the imaginary producing well with the leak.

The PQ curves of the imaginary producing well were generated based on the different assumed top node pressures across the leak zone by forward modeling of the injection model. FIG. 7 is a plot 700 showing a PQ curve for the imaginary producing well with the leak. In FIG. 7, the X-axis shows a volumetric flow rate (in barrels per day) from the high pressure formation to the low pressure formation through the leak, and the Y-axis shows a pressure at the subsurface location of the leak resulting from the volumetric flow rate. The top node pressure was calculated by knowledge of fluid level following Bernoulli's energy balance equation. The stagnation pressure, as described by Bernoulli's principle, is the static pressure at a stagnation point (in this case, leak depth) in a fluid flow (in this case, crossflow at the subsurface location). At a constant entropy, the fluid velocity is zero and all kinetic energy has been converted into pressure energy which makes the stagnation pressure (that is, pressure exerted by the water level on the leak zone) equal to the sum of the dynamic pressure (that is, top node flowing pressure across the leak zone). For a leak depth of 1,374 ft, a fluid level of 20 feet and a water gradient of 0.45, the hydrostatic pressure above the leak was measured to be 609 psi.

At 414, a crossflow rate in the injection well at the location of the subsurface leak in the injection well is determined based on the modeled producing well. For example, the computer system was configured to execute Equation 5 described earlier to calculate the crossflow rate. The computer system compared the flowing top node pressure determined above (that is, 609 psi) with the PQ curve determined for the imaginary producing well to determine that the crossflow rate across the leak zone is 51,445.9 barrels per day (or 35.73 barrels per minute). The crossflow rate across the leak zone for different top node pressures is shown in Table 1.

| | Top Node Pressure (psi) | | | | | | | | |
|---|---|---|---|---|---|---|---|---|---|
| | 400 | 500 | 800 | 1000 | 1200 | 1400 | 1600 | 1800 | 2000 |
| Crossflow rate (barrels per day) | 56641 | 54240 | 47028 | 42051 | 36995 | 31754 | 26498 | 20985 | 15445 |

In addition, the crossflow rate determined by implementing the techniques described above was compared with the crossflow rate determined using a wireline-deployed spinner (50,753 barrels per day), revealing an absolute error of 1.37%.

Figure 8:
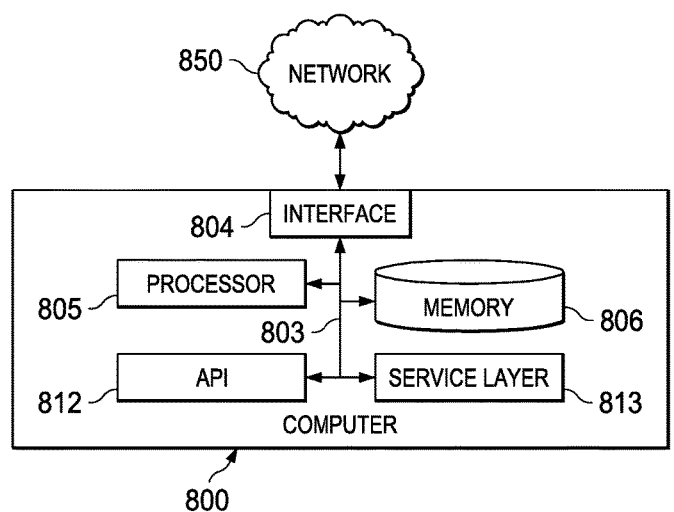
FIG. 8 is a high-level architecture block diagram of a computer system to model crossflow in the injection well.

FIG. 8 is a high-level architecture block diagram of a computer system 800 to model crossflow in the injection well. At a high level, the computer system 800 includes a flow response computer system 800 that is communicably coupled with a network 850. The network 850 facilitates communications between the components of the system 800 with other components. The computer system 800 can receive requests over network 850 from a client application and respond to the received requests by processing the requests in an appropriate software application. In addition, requests may also be sent to the computer system 800 from internal users (for example, from a command console or by another appropriate access method), external or third parties, other automated applications, as well as any other appropriate entities, individuals, systems, or computers.

The computer system 800 is configured to model crossflow in the injection well. In some cases, the computer system 800 is configured to implement the process 300 or the process 400 (or both) in an executable computing code, for example C/C++ executable codes, an application program, for example, EXCEL, or another other computer programs.

The computer system 800 can include a computer that includes an input device, such as a keypad, keyboard, touch screen, microphone, speech recognition device, other device that can accept user information, or an output device that conveys information associated with the operation of the computer, including digital data, visual or audio information, or a GUI.

Each of the components of the computer system 800 can communicate using a system bus 803. In some implementations, any or all the components of the computer system 800, both hardware or software, can interface with each other or the interface 804 over the system bus 803 using an application programming interface (API) 812 or a service layer 813.

The computer system 800 includes an interface 804. Although illustrated as a single interface 804 in FIG. 8, two or more interfaces 804 can be used according to particular needs, desires, or particular implementations of the computer system 800. The interface 804 is used by the computer system 800 for communicating with other systems in a distributed environment connected to the network 850 (whether illustrated or not).

The computer system 800 includes one or more processors (for example, a processor 805). Although illustrated as a single processor 805 in FIG. 8, two or more processors can be used according to particular needs, desires, or particular implementations of the computer system 800. Generally, the processor 805 executes instructions and manipulates data to perform the operations described here.

The computer system 800 also includes a memory 806 that holds data for the computer system 800. Although illustrated as a single memory 806 in FIG. 8, two or more memories may be used according to particular needs, desires, or particular implementations of the computer system 800. While memory 806 is illustrated as an integral component of the computer system 800, in alternative implementations, memory 806 can be external to the computer system 800.

Implementations of the subject matter and the operations described in this Specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
during normal operation of an injection well formed in a subterranean zone, determining a plurality of bottomhole pressures at a bottom of the injection well based on a respective plurality of surface injection pressures at a surface of the injection well, each surface injection pressure being a pressure in the injection well resulting from a respective injection flow rate at which injection fluid is flowed through the injection well from the surface toward the bottom;
determining an Inflow Performance Relationship (IPR) for the injection well based on the plurality of bottomhole pressures and a plurality of injection flow rates, wherein each injection flow rate is caused by each surface injection pressure of the plurality of surface injection pressures, wherein determining the IPR for the injection well based on the plurality of bottomhole pressures and the plurality of injection flow rates comprises determining a PQ curve for the IPR, wherein P represents a bottomhole pressure and Q represents an injection flow rate of the injection fluid into the injection well at the surface of the injection well;
after an injection well shut-in responsive to a subsurface leak in the injection well, wherein the leak causes a crossflow from a high pressure region in the subterranean zone to a comparatively low pressure region in another subterranean zone through the injection well:
modeling the shut-in injection well as a producing well having the IPR determined during normal operation of the injection well; and
determining a crossflow rate in the injection well at a location of the subsurface leak in the injection well based on the IPR of the modeled producing well, wherein P in the PQ curve is determined using the following equation:

$$Pdownhole\ inj. = P_{WH_{inj}} + \frac{\rho_w \sin\emptyset \times D}{144} - \left[\frac{f\rho_w Q^2}{14.79 g_c d^5}\right],$$

where $P_{WH_{inj}}$ is the surface injection pressure measured for the injection flow rate, $\rho_w$ is the density of the injection fluid, ø is a deviation angle of the injection well relative to a vertical axis, f is a dimensionless friction factor, $g_c$ is acceleration due to gravity, and d is an inside diameter of the injection well.

2. The method of claim 1, wherein modeling the shut-in injection well as the producing well having the IPR determined during normal operation of the injection well comprises assigning the location of the subsurface leak in the injection well as a top node of the producing well.

3. The method of claim 2, wherein the IPR for the injection well is determined by modeling the injection well during normal operation and by assigning the surface of the injection well as a top node of the modeled injection well.

4. The method of claim 2, wherein determining the crossflow rate in the injection well at the location of the subsurface leak in the injection well comprises:
determining a production flow rate for the producing well at each bottomhole pressure of the plurality of bottomhole pressures based on which the IPR was determined; and
assigning the production flow rate at each bottomhole pressure as the crossflow rate in the injection well at each bottomhole pressure of the plurality of bottomhole pressures.

5. The method of claim 4, wherein the production flow rate is determined using the following equation: Q=PI(Pr−Pwf), where Q is the production flow rate, PI is a productivity index of the producing well, Pr is a static bottomhole reservoir pressure of the injection well before the injection well shut-in and Pwf is a flowing bottomhole reservoir pressure of the producing well at a selected node, being the subsurface leak depth, after the injection well shut-in responsive to a leak.

6. The method of claim 5, further comprising identifying the static bottomhole reservoir pressure of the injection well before the injection well shut-in.

7. The method of claim 5, further comprising:
using the IPR, determining an injectivity index for the injection well during normal operation of the injection well, wherein the injectivity index is a ratio between an injection flow rate of the injection fluid into the injection well and a difference between a downhole injection pressure resulting from the injection flow rate and a static bottomhole reservoir pressure; and
assigning the injectivity index for the injection well as the productivity index for the producing well.

8. The method of claim 7, further comprising calibrating the determined injectivity index for the injection well during normal operation with a measured injectivity index.

9. The method of claim 1, further comprising determining the location of the subsurface leak in the injection well.

10. The method of claim 9, wherein the location of the subsurface leak in the injection well is determined by mechanical drifting device conveyed via a wireline intervention into the injection well after the injection well has developed the leak.

11. The method of claim 1, wherein Q in the PQ curve is determined using the following equation: Q=II(Pdownhole inj.−Pr), where II is an injectivity index of the injection well and Pr is a static bottomhole reservoir pressure of the injection well before the injection well shut-in.

12. The method of claim 1, wherein the injection fluid is water.

* * * * *